United States Patent [19]

Chien

[11] Patent Number: 5,181,268
[45] Date of Patent: Jan. 19, 1993

[54] STRIPPABLE TIGHT BUFFERED OPTICAL WAVEGUIDE FIBER

[75] Inventor: Ching-Kee Chien, Horseheads, N.Y.

[73] Assignee: Corning Incorporated, Corning, N.Y.

[21] Appl. No.: 743,763

[22] Filed: Aug. 12, 1991

[51] Int. Cl.$^5$ ............................................. G02B 6/22
[52] U.S. Cl. .................................. 385/128; 385/109; 385/123; 174/76
[58] Field of Search ................. 385/128, 123, 109; 174/76, 77 R, 110 SR, 110 V, 110 FC, 110 S, 118

[56] References Cited

U.S. PATENT DOCUMENTS

| | | | |
|---|---|---|---|
| 3,980,390 | 9/1976 | Yamamoto et al. | 350/96 WG |
| 4,072,400 | 2/1978 | Claypoole et al. | 350/96.3 |
| 4,365,865 | 12/1982 | Stiles | 350/96.23 |
| 4,472,021 | 9/1984 | Ansel et al. | 350/96.23 |
| 4,629,286 | 12/1986 | Fuse et al. | 350/96.26 |
| 4,642,265 | 2/1987 | Suzuki | 428/375 |
| 4,660,927 | 4/1987 | Kondow et al. | 350/96.34 |
| 4,723,831 | 2/1988 | Johnson et al. | 350/96.23 |
| 4,741,594 | 5/1988 | Suzuki | 350/96.23 |
| 4,748,871 | 6/1988 | Zdzislaw | 81/9.4 |
| 4,826,278 | 5/1989 | Gartside, III et al. | 350/96.23 |
| 4,852,244 | 8/1989 | Lukas | 29/566.3 |
| 4,854,668 | 8/1989 | Mayr et al. | 385/128 |
| 4,962,996 | 10/1990 | Cuellar et al. | 385/128 |
| 5,011,260 | 4/1991 | Marx et al. | 350/96.23 |
| 5,058,987 | 10/1991 | Hosoya | 385/128 |

FOREIGN PATENT DOCUMENTS 62-99711 5/1987 Japan .

OTHER PUBLICATIONS

Itoh et al., "Low Temperature Excess Loss of UV-Curable Acrylate/Nylon-Coated Optical Fibres", Electronics Letters, vol. 20, No. 21, Oct. 11, 1984, pp. 879-881.

The Fiber Optic Catalog—1988-1989, Siecor Corporation, Hickory, N.C., p. 1.20, 1988.

Primary Examiner—Akm E. Ullah
Assistant Examiner—Stephen W. Barns
Attorney, Agent, or Firm—K. McNeill Taylor, Jr.

[57] ABSTRACT

A tight buffered optical waveguide fiber having improved strippability is provided. The fiber includes a core, a cladding, a first protective coating in contact with the cladding, an interfacial layer in contact with the first protective coating, and a buffer layer in contact with the interfacial layer. The interfacial layer comprises a solid lubricant such as sub-micron particles of polytetrafluoroethylene (PTFE) in a film-forming binder. The concentration of particles at the external surface of the interfacial layer is preferably greater than the concentration at the internal surface so that the interfacial layer is more adherent to the first protective coating than to the buffer layer. This differential adhesion facilitates the manufacturing process while still allowing long lengths (e.g., a foot or more) of either the buffer layer or both the buffer layer and the first protective coating to be removed from the cladding without damage to the fiber's physical and optical properties. A countercurrent technique for applying the interfacial layer to the fiber as a water dispersion is also disclosed.

23 Claims, 2 Drawing Sheets

FIG. 1.
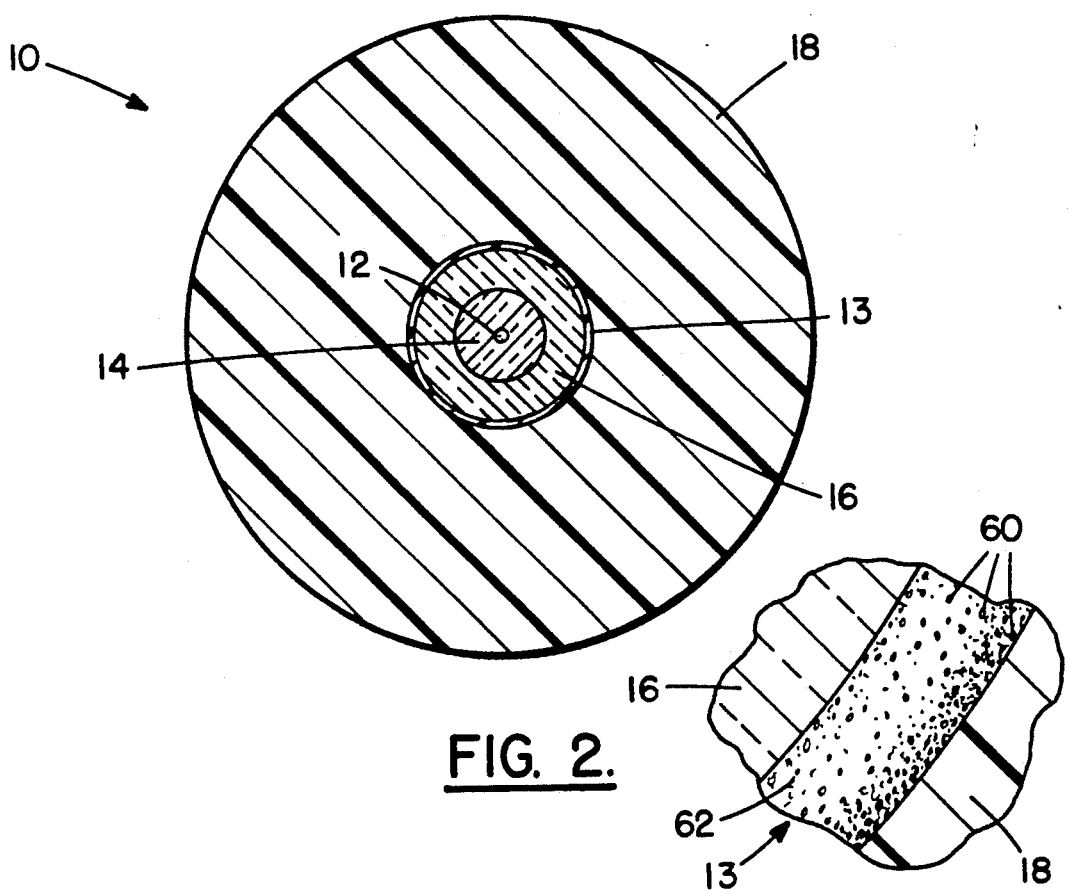
FIG. 2.
FIG. 5.
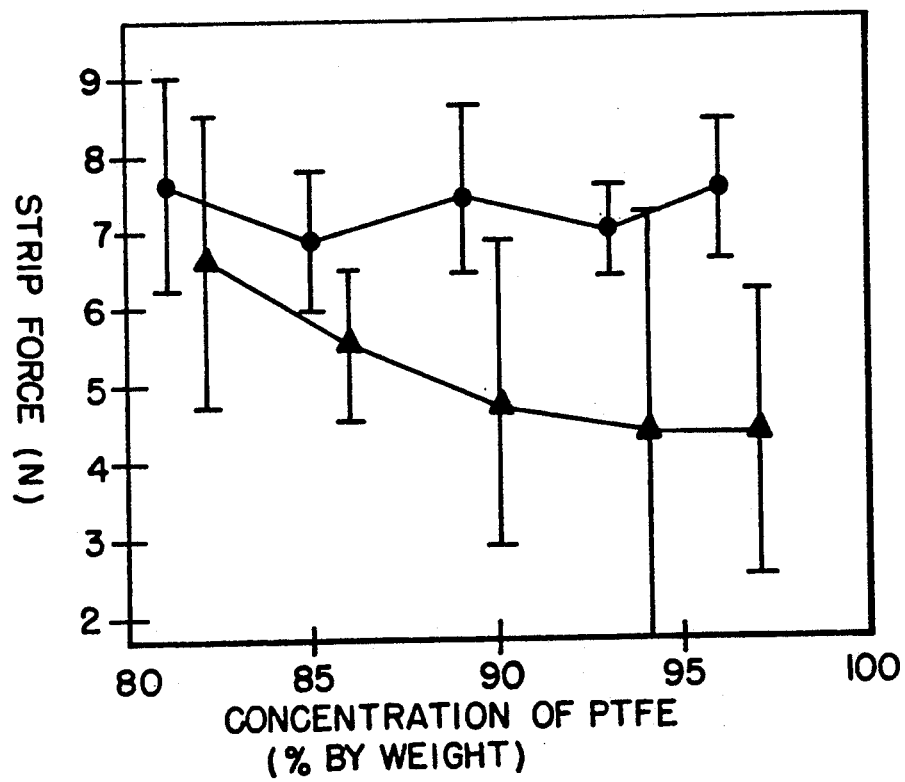

STRIPPABLE TIGHT BUFFERED OPTICAL WAVEGUIDE FIBER

BACKGROUND OF THE INVENTION

This invention relates to optical waveguide fibers and, in particular, to tight buffered optical waveguide fibers having improved strippability.

As is well known in the art, optical waveguide fibers generally comprise a core and a cladding, wherein the core has an index of refraction which is greater than that of the cladding. At the time of manufacture, the cladding is normally coated with one or more layers of a thin plastic material such as a UV-curable acrylate polymer. As used herein, this initial protective layer or layers will be referred to collectively as the fiber's "first protective coating." Typical outside diameters (OD's) for these components are approximately 10 microns for a single mode core (or 50-62.5 microns for a multimode core), 125 microns for the cladding, and 250 microns for the first protective coating.

Because of their relatively fragile nature and because they suffer high increases in attenuation when subjected to tensile, bending or torsion strains, optical waveguide fibers are normally surrounded with at least one relatively thick protective layer which serves to "buffer" the fiber from its surroundings. The protective layer can be spaced from the fiber to form a "loose tube" construction, or can be in direct contact with the fiber to form a "tight buffered" construction. The present invention is concerned with tight buffered fibers.

Numerous tight buffered fibers have been disclosed in the art. See, for example, Yamamoto et al., U.S. Pat. No. 3,980,390, Fuse et al., U.S. Pat. No. 4,629,286, and Stiles, U.S. Pat. No. 4,365,865. Typically, the protective (buffer) layer (also referred to herein as the "second" coating) has a thickness of around 325 microns, so that the overall construction has an outside diameter of around 900 microns. Various materials have been used for the buffer layer including nylons, polyesters, and polyvinyl chlorides.

A recurring problem with this type of construction involves removing (stripping) all of the protective layers from the fiber so as to expose the cladding, i.e., stripping both the buffer layer and the first protective coating from the cladding. Hand operated and motorized tools have been developed for this purpose. See, for example, Zdzislaw, U.S. Pat. No. 4,748,871, and Lukas, U.S. Pat. No. 4,852,244.

Also, first protective coatings having reduced adhesion for the glass cladding have been proposed. See Ansel et al., U.S. Pat. No. 4,472,021, which discloses a coating comprising a UV-curable acrylate compound and an organic polysiloxane, Kondow et al., U.S. Pat. No. 4,660,927, which discloses a silicone coating which can be cured without heating which is said to reduce coating/cladding adhesion, and Suzuki, U.S. Pat. No. 4,642,265, which discloses a silicone coating which includes between 1 and 50 percent by weight of an amorphous silica powder having an average particle size of less than 0.2 microns. Nevertheless, problems have remained because of the tight adhesion between the buffer layer and the first protective coating.

Marx et al. U.S. Pat. No. 5,011,260, filed July 26, 1989, seeks to address this problem by incorporating an ultra-thin layer (0.3 to 0.5 microns) of a decoupling material between the first protective coating and the buffer layer. The decoupling material disclosed is a copolymer blend of polyacrylates sold by the Monsanto Company under the trademark MODAFLOW. The material is water insoluble and thus must be blended with an organic solvent, such as acetone, for processing. The reference describes the use of 97.5% solvent by weight in the blend. Removal and proper disposal of this quantity of a highly volatile and flammable material is a clear disadvantage of this approach.

The incorporation of a release agent between the first protective coating and the buffer layer of an optical waveguide fiber has been disclosed in a number of other references. In particular, Claypoole et al., U.S. Pat. No. 4,072,400, discloses the use of silicone oil, a petroleum lubricant, a layer of colloidal graphite, or talc for this purpose.

The use of silicone oil at the interface between the first protective coating and the buffer layer is also disclosed in Japanese Patent Publication No. 62-99711 and in an article entitled "Low-Temperature Excess Loss of UV-Curable Acrylate/Nylon-Coated Optical Fibres" by H. Itoh, T. Kimura, and S. Yamakawa, Electronics Letters, Vol. 20, No. 21, Oct. 11, 1984, pages 879-881. These references are concerned with the problem of excess signal loss at low temperatures for fibers having a first protective coating composed of a UV-curable polymer and a buffer layer composed of nylon.

In addition to the use of a layer of silicone oil 2-3 microns thick, the Itoh et al. article also discloses using a 50 micron layer of silicone rubber between a first protective coating made of a polybutadiene acrylate and a buffer layer made of nylon. Similarly, the Japanese patent publication states that in addition to silicon system resins covering silicone oils, the powders of fluorine system resins can also be used as a mold releasing agent. The Japanese publication does not include any examples using the powders of fluorine system resins, nor does is disclose any suitable resins or how such resins are to be applied to the first protective coating. Moreover, there is absolutely no disclosure in the reference of the use of a binder in connection with an interfacial layer.

Optical waveguide fibers employing TEFLON polymers as part of a protective system have been disclosed. Thus, Suzuki, U.S. Pat. No. 4,741,594, discloses the use of expanded, porous polytetrafluoroethylene (PTFE) as a buffer material for optical waveguide fibers. Johnson et al., U.S. Pat. No. 4,723,831, and Gartside, III et al., U.S. Pat. No. 4,826,278, disclose loose tube constructions employing core wraps composed of woven fiber glass impregnated with PTFE (Johnson) and TEFLON tape (Gartside). A loose tube construction employing a fluoropolymer tube is disclosed in *The Fiber Optic Catalog*—1988-1989, Siecor Corporation, Hickory, N.C., page 1.20, 1988.

SUMMARY OF THE INVENTION

In view of the foregoing, it is an object of this invention to provide tight buffered optical waveguide fibers having improved strippability. More particularly, it is an object of the invention to provide tight buffered optical waveguide fibers having an interfacial layer between the first protective coating and the buffer layer which allows for easy stripping of either the buffer layer and the first protective coating in one step or of the buffer layer and then the first protective coating in two steps.

It is a further object of the invention to provide an interfacial layer which cannot flow out of the fiber and contaminate electronic components as in the case of release agents composed of silicone oils (see Claypoole et al., Itoh et al., and Japanese Patent Publication No. 62-99711, supra).

It is an additional object of the invention to provide improved methods for applying an interfacial layer between a first protective coating and a tight buffer layer. In particular, it is an object of the invention to provide methods which are 1) simple to implement and 2) can be readily integrated into existing process for producing optical waveguide fibers.

It is another object of the invention to provide coating methods and compositions by means of which solid lubricants, such as particles of polytetrafluoroethylene (TEFLON), can be used to form a low friction interfacial layer between a fiber's first protective coating and its buffer layer.

To achieve the foregoing and other objects, the invention in accordance with certain of its aspects provides tight buffered optical waveguide fibers comprising:

(a) an optical waveguide fiber;

(b) a first protective coating which surrounds and is in contact with the external surface of the optical waveguide fiber;

(c) an interfacial layer which surrounds the first protective coating and which is composed of a solid lubricant, such as particles of polytetrafluoroethylene, and a film-forming binder; and (d) a second protective coating, i.e., a buffer layer, which surrounds and is in contact with the external surface of the interfacial layer.

As illustrated by the examples presented below, tight buffered optical waveguide fibers having this structure and composition have been found to have excellent strippability properties. In particular, a foot or more of either the buffer layer or both the buffer layer and the first protective coating can be readily stripped from the fiber without damage to the fiber's optical or physical properties. Among other things, this high level of strippability results in a saving of valuable space in splicing boxes where fibers are joined to one another.

In accordance with other aspects of the invention, methods for forming tight buffered optical waveguide fibers are provided which comprise the steps of:

(a) coating the fiber's first protective coating with a mixture comprising:

(i) a liquid carrier, e.g., water;

(ii) a film-forming binder, e.g., an acrylic polymer or a mixture of such polymers; and (iii) a solid lubricant, e.g., particles of polytetrafluoroethylene;

(b) removing, e.g., evaporating, the liquid carrier from the surface of the fiber to form an interfacial layer on the external surface of the first protective coating; and (c) applying a buffer layer to the external surface of the interfacial layer.

In certain preferred embodiments of these aspects of the invention, the mixture of step (a) is applied to the fiber by flowing the mixture in one direction and passing the fiber through the flowing mixture in the opposite direction.

In practice, the foregoing method is readily integrated into the overall process for producing optical waveguide fibers, which is an important advantage of the invention.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIG. 1 is a cross-sectional view of a tight buffered optical waveguide fiber constructed in accordance with the invention.

FIG. 2 is an expanded, cross-sectional view of an interfacial layer constructed in accordance with the invention.

FIG. 5 is a graph which plots strip force in Newtons versus the concentration of solid lubricant in the interfacial layer in weight percent. The data points shown by circles represent the force required to remove both the buffer layer and the first protective coating in one pass, while the data points shown by triangles represent the force required to remove just the buffer layer. The bars represent the standard deviations of the measurements with 95% confidence.

DESCRIPTION OF THE PREFERRED EMBODIMENTS

Figure 3:
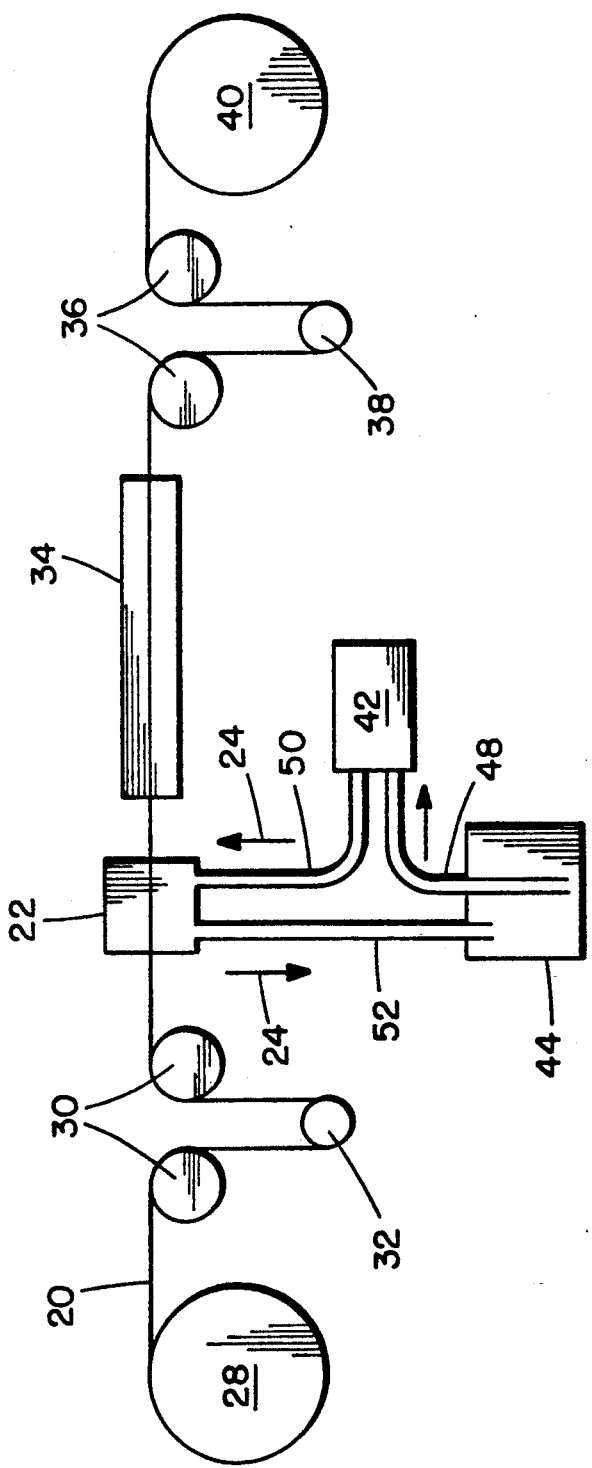
FIG. 3 is a schematic diagram of a preferred process for applying an interfacial layer to an optical waveguide fiber.

As discussed above, the present invention relates to tight buffered optical waveguide fibers having improved strippability. The invention can be used with a variety of optical waveguide fibers now known or subsequently developed, including, without limitation, single mode and multimode fibers, silica-based and non-silica-based fibers, and plastic fibers.

A cross-section of tight buffered optical waveguide fiber 10 prepared in accordance with the invention is shown in FIG. 1. The fiber includes core 12, cladding 14, first protective coating 16, and buffer layer 18. Between the first protective coating and the buffer layer is interfacial layer 13 which provides the desired improved strippability.

Core 12 and cladding 14 together make up the optical waveguide fiber. Typically, the cladding comprises substantially pure silica and the core comprises silica which has been doped to increase its index of refraction. As indicated above, the OD of a single mode core is generally around 10 microns, while that of a fiber cladding is around 125 microns. The OD of a multimode core is typically around 50–62.5 microns.

First protective coating 16 is composed of a polymeric material which most commonly is a UV curable acrylate polymer. Typically, the coating is composed of two layers of acrylate polymer, wit the inner layer having a lower modulus than the outer layer. The OD of the first protective coating is generally around 250 microns.

Buffer layer 18 is also composed of a polymeric material. Among the materials which are commonly used for this layer are polyvinylchlorides, nylons, and polyesters. The OD of the buffer layer for a tight buffered construction is normally 900 microns.

Interfacial layer 13 is of critical importance to the present invention since it provides a low friction interface between the first protective coating and the buffer layer. This layer will generally have a thickness of between about 4 and about 15 microns, and preferably, about 5 microns. The layer is composed of a solid lubricant and a film-forming binder, with the solid lubricant comprising preferably more than about 60% by weight of the layer and most preferably at least about 90%. In terms of function, the solid lubricant provides the desired improved strippability, while the binder holds the lubricant in place on the first protective coating.

Various materials can be used for the solid lubricant, the preferred materials being particles of a low friction polymeric material (illustrated at 60 in FIG. 2). To facilitate processing, the particles are preferably dispersible in water. Examples of particles having these properties include those made of polytetrafluorethylene (TEFLON) or ultra high molecular weight polyethylene (UHMWPE). The particles preferably have an average or nominal size of less than a micron, e.g., on the order of 0.22 microns for TEFLON particles. Aqueous dispersions of TEFLON particle are available from the Specialty Polymers Division of E. I. Du Pont De Nemours & Co., Wilmington, Del., and of UHMWPE particles from Chemical Corp. of America, East Rutherford, N.J. Depending upon the processing conditions, a surfactant can be added to the particle dispersion if desired.

The film-forming binder (illustrated at 62 in FIG. 2) serves the important function of holding the solid lubricant in place both during processing, e.g., during application of the buffer layer, and during use of the finished fiber. As such, the film-forming binder should have a surface which is non-tacky and which has a hardness sufficient to withstand processing using conventional coating equipment. In practice, surfaces having a Knoop hardness number (KHN) of at least about five as measured with a Tukon Micro-hardness Tester have been found to work successfully in the practice of the invention. See ASTM D 1474. When used with water dispersible particles, the film-forming binder should also be water dispersible.

The composition of the film-forming binder is chosen so that the binder will have an adequate level of adherence to the first protective coating so as to hold the solid lubricant in place on that coating. Also, at least a moderate level of adherence between the interfacial layer and the first protective coating aids in processing of the fiber, e.g., in overcoating the interfacial layer with the buffer layer. For a first protective coating composed of acrylate polymers, the desired adherence can be achieved by using, for example, a film-forming binder which is also composed of acrylate polymers so as to provide chemical compatibility between the binder and the first protective coating.

Preferably, the interfacial layer is more adherent to first protective coating 16 than to buffer layer 18. In this way, the buffer layer can be readily stripped from the fiber leaving behind the interfacial layer and the first protective coating.

An interfacial layer comprising TEFLON particles and a binder composed of acrylic polymers, such as those sold by Rohm and Haas Company (Philadelphia, Pa.) under the RHOPLEX trademark, has been found to bind more strongly to a first protective coating composed of an acrylate polymer than to a buffer layer composed of polyvinylchoride (PVC). In particular, when an interfacial layer of this type is applied to the first protective coating as a water dispersion, the particles tend to "bloom" to the external surface of the interfacial layer (see FIG. 2). This blooming produces an increased concentration of particles at the external surface which reduces the adherence between the interfacial layer and the buffer layer.

Figure 4:
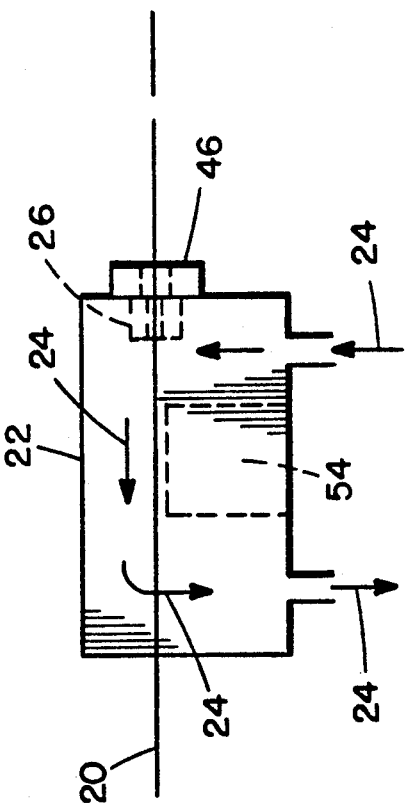
FIG. 4 is a schematic diagram of a coater for use in the process of FIG. 3.

The optical waveguide fiber and the first protective coating can be formed by conventional processes known in the art. Similarly, the buffer layer can be applied to the interfacial layer using conventional coating techniques. The interfacial layer itself is preferably formed using a liquid (water) dispersion of the solid lubricant and the film-forming binder. FIGS. 3 and 4 show suitable apparatus for forming this layer.

In overview, the coating process shown in these figures employs a countercurrent flow technique wherein fiber 20 passes through coater 22 from left to right while the dispersion passes through the coater in the opposite direction, i.e., from right to left as shown by arrows 24 in the figures. This countercurrent technique improves the coating process in two ways. First, it washes coagulated particles away from die 26. Such clumps of particles, if large enough, can plug the die and result in fiber breakage. Second, the countercurrent flow also moves any air bubbles which form in the dispersion away from the die. Although such bubbles do not normally result in fiber breakage, if they become centered on the die, they can interrupt the flow of the dispersion, thus preventing the fiber from being coated.

The apparatus shown in FIGS. 3 and 4 operates as follows. Fiber 20, which comprises a core, a cladding, and a first protective coating, is fed from payout spool 28 through pulleys 30 and dancer 32 to coater 22. Pump 42 feeds dispersion from coating reservoir 44 to coater 22 by means of feed lines 48 and 50. The dispersion returns to the coating reservoir by means of line 52.

Lines 48, 50, and 52 can be TYGON tubing and pump 42 can be a peristaltic pump producing a flow rate on the order of 270 milliliters per minute. Because particles of solid lubricant and, in particular, TEFLON particles undergo shear-induced coagulation, pumps which produce less shear than peristaltic pumps can be used if desired. For example, air driven double diaphragm pumps feeding into large diameter tubing, e.g., one and a half inch tubing, can be used to produce reduced shear levels.

As shown in FIG. 4, coater 22 includes die 26, die holder 46, and baffle 54 which guides the incoming dispersion so that it flows horizontally past fiber 20. For an input fiber whose diameter is less than or equal to 245 microns, a 11.0 mil die can be used, and for fibers having a diameter somewhat greater than 245 microns, the size of the die can be increased to 11.26 mil. In either case, the thickness of the dried interfacial layer will be about 5 microns. Dispersions of TEFLON particles and a RHOPLEX binder have been found to turn slightly bluish when in contact with brass fittings. Accordingly, such fittings should generally be avoided in constructing coater 22 and its associated feed system.

After leaving coater 22, the fiber passes through drying oven 34 which removes the water from the dispersion. A three stage oven having a first 0.5 meter segment operated at 170° C., a second 0.5 meter segment operated at 225° C., and a third 1.0 meter segment operated at 300° C. has been found to work successfully. Air is bled through the oven to remove evaporated water. The Du Pont dispersions of TEFLON particles referred to above include a small amount of ammonia for pH control. Similarly, the RHOPLEX binders include ammonia as well as traces of ethyl acetate. To avoid discharge of these materials into the atmosphere, a fume hood can be placed at the exit of oven 34.

After leaving oven 34, the coated fiber is allowed to air cool and then passes through pulleys 36 and dancer 38 for collection on take-up spool 40. Buffer layer 18 can then be applied to the fiber using conventional extrusion techniques. Alternatively, the dried fiber can be directly fed into an extrusion coater without an intermediate collection step. In such a case, the fiber needs to be adequately cooled before the buffer layer is applied. Such cooling can be facilitated by passing a high volume air stream over the dried fiber prior to the application of the buffer layer.

Without intending to limit it in any manner, the present invention will be more fully described by the following example.

EXAMPLE

Tight buffered optical waveguide fibers were prepared having an interfacial layer between a first protective coating and a buffer layer. The first protective coating comprised two layers of UV curable acrylate resin available from DSM-Desotech, Inc. (Des Plains, Ill.) under the product designations 950–076 (inner layer) and 955–044 (outer layer). The OD of the first protective coating prior to the application of the interfacial layer was approximately 250 microns.

The buffer layer comprised a single layer of PVC polymer available from Gary Chemical, Leominster, Mass., under the product designation PVC GW 2052 Special. The OD of this layer was 900 microns.

The interfacial layer was made from a water dispersion of Du Pont TEFLON particles sold under the product designation 30B and a 1:1 mixture by volume of two Rohm and Haas RHOPLEX binders sold as water dispersions under the product designations B-60A and B-85. Typical properties of these materials are set forth in Table 1. In addition to the TEFLON particles, the 30B product also contains approximately eight percent (by weight of PTFE) of a non-ionic wetting agent and stabilizer. See Du Pont Product Brochure entitled "Fluoropolymers Industrial —Grade 30B", 1988.

RHOPLEX B-60A is a soft material, while RHOPLEX B-85 is a hard material. See Rohm and Haas Product Brochure entitled "RHOPLEX B-85 Acrylic Emulsion Polymer", 1983. The 1:1 mixture o these two materials provides a binder having sufficient hardness for subsequent processing and a film-forming temperature of approximately 21° C. Higher amounts of B-85 result in higher film-forming temperatures which reduces processing flexibility at room temperature.

To form the particle/water/binder dispersion, the RHOPLEX B-60A and B-85 were mixed together with slow stirring and then mixed with the TEFLON 30B dispersion. The volumes of RHOPLEX mixture and TEFLON dispersion were varied to produce TEFLON dispersion weight percents in the final mixture of between 75 and 95 percent. A surfactant sold by 3M under the product designation FC-143 was included in the final dispersion at a concentration of 3% of the TEFLON by weight. Dispersions in which the surfactant was omitted were found to work equally well.

The dispersion was coated onto the fiber's first protective coating at a steady-state line speed of approximately 1.0 meter/second. Slower line speeds, e.g., on the order of 0.25 meters/second, were used during process start-up, i.e., until the drying oven was heated to its steady-state operating temperature. The final dried thickness of the interfacial layer was approximately 4 microns.

Strip force measurements were made on the finished fiber using a Micro Electronics stripper (Seekonk, Mass.) with pairs of 6 or 12 mil blades following EIA/TIA FOTP-178 (1.5 cm of strip length and 0.5 inches/minute of stripping speed).

The results of a typical experiment is shown in FIG. 5, where the strip force in Newtons is plotted along the vertical axis and the concentration in weight percent of the TEFLON (PTFE) in the interfacial layer is plotted along the horizontal axis. The data shown by circles represents the force levels needed to strip both the buffer layer and the first protective coating from the fiber in one pass, while that shown by triangles represents the force levels required to strip just the buffer layer. The triangle data points have been shifted to the right by 1% so that the error bars will not overlap.

As shown in this figure, the required stripping forces are small over the entire range of solid lubricant concentrations, i.e., they are less than about 8 Newtons as opposed to being on the order of 17 Newtons for comparable fibers without an interfacial layer. As also shown in this figure, the force required to strip both the buffer layer and the first protective coating is roughly constant over the range of solid lubricant concentrations tested, while the force required to strip just the buffer layer tends to decrease as the concentration of solid lubricant increases.

Because of these low strip forces, long lengths of protective coating can be readily removed from the fibers. In particular, it was found that using a two pass procedure up to 15 inches of both the buffer layer and the first protective coating could be removed without fiber breakage. For comparison, only about a half an inch of the protective coatings could be repeatedly removed from comparable fiber without an interfacial layer.

Fibers having an interfacial layer were also tested for optical properties and were found to have completely acceptable loss characteristics. Moreover, the performance of the fibers at low temperatures was improved. Tests with fibers having an experimental first protective coating manufactured by DSM-Desotech under the designation 3471-1-100 for the inner layer and 3471-2-66 for the outer layer were also performed. This coating was designed by DSM-Desotech to minimize cure time and water absorption. The experimental coating produced even better low temperature performance than that observed with the 950–076 and 950–044 coatings. The strip forces were similar to those shown in FIG. 5.

A variety of modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

|  | TEFLON 30B | RHOPLEX B-60A | RHOPLEX B-85 |
|---|---|---|---|
| Appearance | White Milky | White Milky | White Milky |
| Resin solid % | 60 | 46.5 | 38 |
| Specific gravity of liquid | 1.5 | 1.07 | 1.07 |

TABLE 1-continued

| | TEFLON 30B | RHOPLEX B-60A | RHOPLEX B-85 |
|---|---|---|---|
| pH | 9.8 | 9.5 | 9.7 |

What is claimed is:

1. A tight buffered optical waveguide fiber comprising:
    (a) an optical waveguide fiber;
    (b) a first protective coating surrounding and in contact with the external surface of the optical waveguide fiber;
    (c) an interfacial layer surrounding and in contact with the external surface of the first protective coating, said layer comprising a solid lubricant and a film-forming binder; and
    (d) a second protective coating surrounding and in contact with the external surface of the interfacial layer.

2. The tight buffered optical waveguide fiber of claim 1 wherein the interfacial layer is more adherent to the first protective coating than to the second protective coating.

3. The tight buffered optical waveguide fiber of claim 1 wherein the solid lubricant comprises particles of a polymeric material.

4. The tight buffered optical waveguide fiber of claim 3 wherein the concentration of particles in the region of the interfacial layer's external surface is greater than the concentration of particles in the region of the interfacial layer's internal surface.

5. The tight buffered optical waveguide fiber of claim 4 wherein the difference in the concentrations of particles in the regions o the internal and external surfaces of the interfacial layer causes that layer to be less adherent to the second protective coating than to the first protective coating.

6. The tight buffered optical waveguide fiber of claim 3 wherein the interfacial layer is applied to the first protective coating as a liquid dispersion of the particles.

7. The tight buffered optical waveguide fiber of claim 6 wherein the liquid dispersion is an aqueous dispersion.

8. The tight buffered optical waveguide fiber of claim 3 wherein the particles comprise polytetrafluoroethylene.

9. The tight buffered optical waveguide fiber of claim 3 wherein the particles comprise ultra high molecular weight polyethylene.

10. The tight buffered optical waveguide fiber of claim 1 wherein the film-forming binder has a Knoop hardness number of at least about five.

11. The tight buffered optical waveguide fiber of claim 1 wherein the film-forming binder comprises an acrylic polymer.

12. The tight buffered optical waveguide fiber of claim 1 wherein the solid lubricant comprises more than about 60 percent by weight of the interfacial layer.

13. The tight buffered optical waveguide fiber of claim 12 wherein the solid lubricant comprises at least about 90 percent by weight of the interfacial layer.

14. The tight buffered optical waveguide fiber of claim 1 wherein the interfacial layer has a thickness of between about 4 microns and about 15 microns.

15. The tight buffered optical waveguide fiber of claim 1 wherein the length of the second protective coating which can be stripped from the fiber is greater than about 12 inches.

16. A method for forming a tight buffered optical waveguide fiber comprising the steps of:
    (a) providing an optical waveguide fiber;
    (b) applying a first protective coating to the external surface of the optical waveguide fiber;
    (c) coating the external surface of the first protective coating with a mixture comprising:
        (i) a liquid carrier;
        (ii) a film-forming binder; and
        (iii) a solid lubricant comprising particles of a polymeric material;
    (d) removing the liquid carrier to form an interfacial layer on the external surface of the first protective coating comprising the film-forming binder and the solid lubricant; and
    (e) applying a second protective coating to the external surface of the interfacial layer.

17. The method of claim 16 wherein the liquid carrier comprises water.

18. The method of claim 17 wherein step (d) is performed by passing the fiber through an oven to evaporate the water.

19. The method of claim 16 wherein the particles comprise polytetrafluoroethylene.

20. The method of claim 16 wherein the particles comprise ultra high molecular weight polyethylene.

21. The method of claim 16 wherein the film-forming binder comprises an acrylic polymer.

22. The method of claim 16 wherein step (c) is performed by flowing the mixture in one direction and passing the fiber through the flowing mixture in the opposite direction.

23. The method of claim 16 wherein at the end of step (d), the concentration of particles in the region of the interfacial layer's external surface is greater than the concentration of particles in the region of the interfacial layer's internal surface.

* * * * *